J. M. GRAVES.
Cultivator.

No. 199,972. Patented Feb. 5, 1878.

WITNESSES:
E. Wolff
J. H. Scarborough

INVENTOR:
J. M. Graves.
BY Munn & Co
ATTORNEYS.

UNITED STATES PATENT OFFICE.

JEFFERSON M. GRAVES, OF BLOSSOM PRAIRIE, TEXAS.

IMPROVEMENT IN CULTIVATORS.

Specification forming part of Letters Patent No. 199,972, dated February 5, 1878; application filed November 3, 1877.

*To all whom it may concern:*

Figure 1:
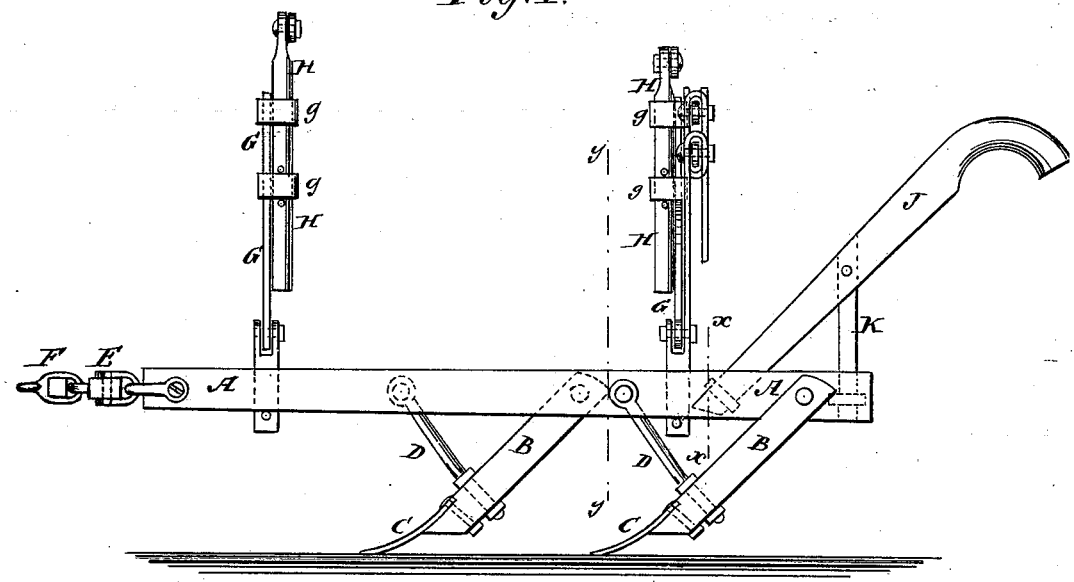
Figure 2:
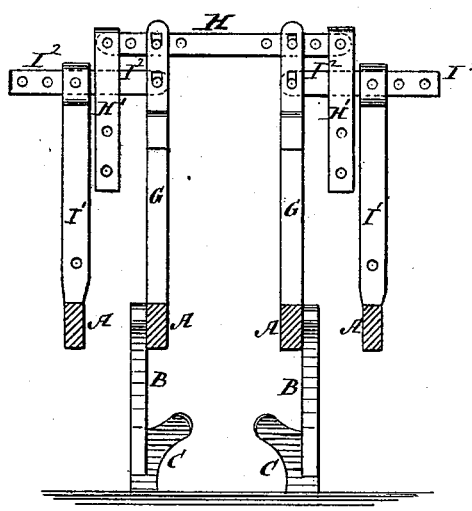
Figure 3:
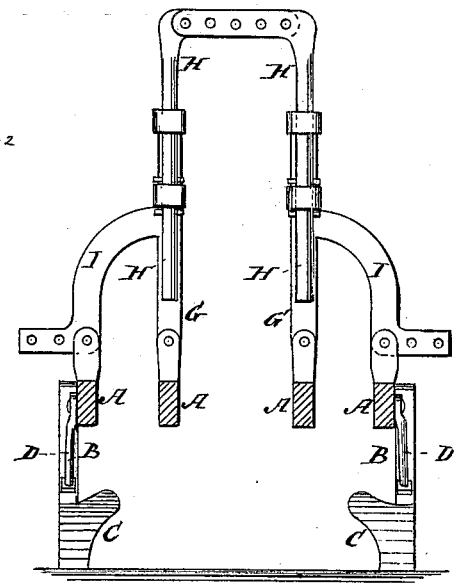

Be it known that I, JEFFERSON MONROE GRAVES, of Blossom Prairie, in the county of Lamar and State of Texas, have invented a new and useful Improvement in Cultivators, of which the following is a specification:

Referring to the accompanying drawings, forming part of this specification, Figure 1 is a side view of my improved cultivator. Fig. 2 is a vertical cross-section of the same, taken through the line $x\ x$, Fig. 1, looking forward. Fig. 3 is a vertical cross-section of the same, taken through the line $y\ y$, Fig. 2, looking rearward.

Similar letters of reference indicate corresponding parts.

The object of this invention is to furnish improved cultivators which shall be so constructed that the beams and plows may be adjusted at any desired distance apart, that will pass over tall plants without injuring them, and which shall be simple in construction and easily adjusted.

The invention will first be described in connection with the drawings, and then pointed out in the claim.

In the drawings, A are four plow-beams, to each of which is attached the upper end of a plow-standard, B. To the lower ends of the standards B are attached the plows C, and the draft-strain upon the said standards is sustained by the braces D, the lower ends of which are attached to the said standards B, and their upper ends are attached to the beams A.

Any desired kind of plows C may be used, as the kind of work to be done or the wish of the buyer may require.

The forward end of each of the beams A is connected by clevises with the double-tree E, to the ends of which are attached the whiffletrees F. When the plants are too tall to pass beneath the double-tree E, it may be omitted, and each side pair of beams may be attached directly to a whiffletree, F, leaving a clear space between the two middle beams. In this case the two middle beams, near their forward ends, are connected by the adjustable arch G H. The lower bars G of the arch G H are pivoted to the beams A by notched eyebolts attached to said beams, or by other suitable means. To the side of the bars G are attached keepers $g$, to receive the lower arms of the bars H, which are bent at right angles, so that their upper arms may overlap each other.

A number of holes are formed in the upper and lower arms of the bars H to receive the key-bolts, by which their upper arms are secured to each other, and their lower arms are secured in place in the keepers $g$, so that the arch may be adjusted at any desired height, and the plow-beams adjusted at any desired distance apart.

When only two plow-beams A are to be used, their forward ends may be attached to a double-tree or to a whiffletree, according as one or two horses are to be used. In this case the arch G H should be attached to the rear parts of the said beams A.

When four plow-beams A are to be used, curved arms I are formed upon or attached to the bars G, the lower ends of which are pivoted to the outer beams A, as shown in Fig. 3. In this case the lower ends of the curved arms I should be bent outward, and should have a number of pivot-holes formed through them, so that the side beams may be adjusted at any desired distance from the middle beams.

If desired, the curved arms I may be replaced by two bars, $I^1\ I^2$, pivoted to each other adjustably, as shown in Fig. 2; but in this case the upright bars $I^1$ should be rigidly attached to the side beams A. In the same way the two bent bars H may be replaced by the two upright bars $H^1$ and the cross-bar $H^2$, adjustably connected together; but in this case the lower ends of the bars G should be rigidly attached to the middle beams A. In this case the upright bars $H^1$ need not be used except when plowing tall plants, the cross-bar $H^2$ being attached to the upper ends of the bars G.

J are the handles, which are attached to the rear parts of the middle beams A, and which are supported at the proper height by the uprights K, attached to them and to the rear ends of the said middle beams A.

Having thus described my invention, I claim as new and desire to secure by Letters Patent—

The combination of beams A, bars G, having curved arms I, and the pivoted angle-bars H, all connected and arranged as and for the purpose specified.

JEFFERSON MONROE GRAVES.

Witnesses:
W. R. JOHNS,
HENRY MOORE.